(12) United States Patent
Subramanian

(10) Patent No.: US 10,063,134 B2
(45) Date of Patent: Aug. 28, 2018

(54) VOLTAGE SOURCE CONVERTER WITH IMPROVED OPERATION

(71) Applicant: ABB Schweiz AG, Baden (CH)

(72) Inventor: Sasitharan Subramanian, Ludvika (SE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 15/566,084

(22) PCT Filed: May 5, 2015

(86) PCT No.: PCT/EP2015/059775
§ 371 (c)(1),
(2) Date: Oct. 12, 2017

(87) PCT Pub. No.: WO2016/177398
PCT Pub. Date: Nov. 10, 2016

(65) Prior Publication Data
US 2018/0091038 A1    Mar. 29, 2018

(51) Int. Cl.
*H02M 7/521* (2006.01)
*H02M 1/32* (2007.01)
(Continued)

(52) U.S. Cl.
CPC .............. *H02M 1/32* (2013.01); *H02M 1/12* (2013.01); *H02M 1/15* (2013.01); *H02M 7/1626* (2013.01);
(Continued)

(58) Field of Classification Search
CPC .... H02M 2001/008; H02M 1/02; H02M 1/12; H02M 1/042; H02M 1/045;
(Continued)

(56) References Cited

U.S. PATENT DOCUMENTS 5,642,275 A * 6/1997 Peng ................ H02M 7/49
363/137
6,005,788 A * 12/1999 Lipo ................ H02M 7/49
363/71
(Continued)

FOREIGN PATENT DOCUMENTS

WO   WO 2014/082657 A1   6/2014
WO   WO 2014/082661 A1   6/2014

OTHER PUBLICATIONS

International Preliminary Report on Patentability, issued in PCT/EP2015/059775, dated Mar. 28, 2017.
(Continued)

*Primary Examiner* — Alex Torres-Rivera
(74) *Attorney, Agent, or Firm* — Birch, Stewart, Kolasch & Birch, LLP

(57) ABSTRACT

A voltage source converter has director valve phase legs in parallel with waveshaper phase legs between two DC terminals. The director valve and waveshaper phase legs include upper and lower phase arms alternately operated to form waveshapes on AC terminals of the converter, thereby allowing a number of waveshaper phase arms to be available for use for other purposes. At least one of the available phase arms is controlled to contribute to other aspects of converter operation than waveshaping.

22 Claims, 9 Drawing Sheets

(51) Int. Cl.
  *H02M 7/49* (2007.01)
  *H02M 7/493* (2007.01)
  *H02M 1/12* (2006.01)
  *H02M 7/162* (2006.01)
  *H02M 7/19* (2006.01)
  *H02M 1/15* (2006.01)
  *H02M 1/00* (2006.01)
  *H02M 7/483* (2007.01)

(52) U.S. Cl.
  CPC .............. *H02M 7/19* (2013.01); *H02M 7/49* (2013.01); *H02M 7/493* (2013.01); *H02M 2001/0074* (2013.01); *H02M 2007/4835* (2013.01)

(58) Field of Classification Search
  CPC ......... H02M 2001/0074; H02M 1/084; H02M 1/0845; H02M 1/088; H02M 7/1626; H02M 7/19; H02M 7/483; H02M 2007/4835; H02M 7/49; H02M 7/493; H02M 7/497; H02M 7/505; H02M 7/53; H02M 7/537; H02M 7/53803
  USPC ....... 363/95, 96, 97, 98, 120, 131, 132, 135, 363/136, 137, 138
  See application file for complete search history.

(56) References Cited

U.S. PATENT DOCUMENTS

| | | | |
|---|---|---|---|
| 9,531,292 B2* | 12/2016 | Bhalodi | H02M 7/483 |
| 2013/0258726 A1 | 10/2013 | Mukherjee et al. | |
| 2014/0003101 A1* | 1/2014 | Tang | H02M 1/14 363/40 |
| 2015/0357905 A1* | 12/2015 | Nami | H02M 1/32 363/53 |
| 2016/0241127 A1* | 8/2016 | Jasim | H02M 7/483 |
| 2016/0248341 A1* | 8/2016 | Trainer | H02M 7/483 |
| 2016/0308458 A1* | 10/2016 | Jimichi | H02M 1/32 |
| 2017/0170658 A1* | 6/2017 | Tengner | H02J 3/1857 |
| 2017/0250621 A1* | 8/2017 | Townsend | H02M 7/487 |
| 2017/0338654 A1* | 11/2017 | Subramanian | H02J 3/36 |
| 2018/0034382 A1* | 2/2018 | Chivite Zabalza | H02M 7/217 |

OTHER PUBLICATIONS

International Search Report, issued in PCT/EP2015/059775, dated Jan. 22, 2016.
Written Opinion of the international Searching Authority, issued in PCT/EP2015/059775, dated Jan. 22, 2016.

* cited by examiner

VOLTAGE SOURCE CONVERTER WITH IMPROVED OPERATION

FIELD OF INVENTION

The present invention generally relates to voltage source converters. More particularly the present invention relates to a voltage source converter, a method of controlling the voltage source converter and a computer program product for such a voltage source converter.

BACKGROUND

Director valve based voltage source converters have recently been developed where there is a string of director valves connected in series between two Direct Current (DC) poles and a string of multilevel cells connected in parallel with this valve string. In this structure the director valves are used for directivity and the multilevel cells for waveshaping. A voltage source converter where the director valves are thyristors is for instance disclosed in WO2014/082657.

The structure may furthermore be used with all three Alternating Current (AC) phases provided through three such valve strings connected in series between two DC poles and three multilevel strings also connected in series between the two DC poles and in parallel with the valves.

In this latter structure there may be a number of problems that may occur.

If the AC voltage varies when the multilevel cells are used, then also the average DC voltage is changed. The AC and DC voltages are coupled to each other.

Furthermore, AC fault ride-through is not possible if AC voltage and DC voltage are tightly coupled.

The DC voltage from the converter furthermore comprises 6n harmonics which can be eliminated by passive filters. However, passive DC filters are bulky and occupy a lot of space. It may therefore be of interest to remove and/or limit the size and complexity of such DC filters.

The invention addresses one or more of the above mentioned problems.

With regard to this it would be of interest to provide an improved voltage source converter and especially one where the DC voltage is decoupled from the AC voltage.

SUMMARY OF THE INVENTION

The present invention is directed towards obtaining a director valve based voltage source converter where the DC voltage is decoupled from the AC voltage.

This object is according to a first aspect of the present invention achieved through a voltage source converter having two DC terminals and a number of AC terminals for providing a number of phases of an AC voltage, the converter comprising:

a number of director valves connected in series between the DC terminals, the director valves being provided in pairs, where each pair forms a valve phase leg comprising an upper and a lower valve phase arm, where the junction between the two valve phase arms of a valve phase leg provides a primary AC terminal for a corresponding AC phase, a number of multilevel cells connected in series between the DC terminals, the cells being grouped in waveshaper phase legs, where each waveshaper phase leg is connected in parallel with a corresponding valve phase leg and comprises an upper and a lower waveshaper phase arm, where the junction between the upper and lower waveshaper phase arm of a waveshaper phase leg provides a secondary AC terminal for a corresponding AC phase and linked to the primary AC terminal of the corresponding valve phase leg, where the upper waveshaper phase arm (WS1A, WS1B, WS1C) of a waveshaper phase leg is configured to be operated in conjunction with the upper valve phase arm of the corresponding valve phase leg and the lower waveshaper phase arm of a waveshaper phase leg is configured to be operated in conjunction with the lower valve phase arm of the corresponding valve phase leg, for forming of an AC waveform at least during steady state operation, and a control unit configured to control each waveshaper phase leg and valve phase leg for forming a number of phases of an output AC voltage, where the voltage of one phase is formed on the primary and secondary AC terminals of a pair of valve and waveshaper phase legs through alternately operating the valve of the upper valve phase arm and the cells of the corresponding upper waveshaper phase arm with the valve of the lower valve phase arm and cells of the corresponding lower waveshaper phase arm, thereby allowing one waveshaper phase arm in each phase to be available for use for other purposes, wherein the control unit is further configured to control at least one of the available waveshaper phase arms to contribute to other aspects of converter operation than waveshaping.

This object is according to a second aspect of the invention achieved through a method of controlling a voltage source converter having two DC terminals and a number of AC terminals for providing a number of phases of an AC voltage, the converter comprising a number of director valves connected in series between the DC terminals, the director valves being provided in pairs, where each pair forms a valve phase leg comprising an upper and a lower valve phase arm, where the junction between the two valve phase arms of a valve phase leg provides a primary AC terminal for a corresponding AC phase and a number of multilevel cells connected in series between the DC terminals, the cells being grouped in waveshaper phase legs, where each waveshaper phase leg is connected in parallel with a corresponding valve phase leg and comprises an upper and a lower waveshaper phase arm, where the junction between the upper and lower waveshaper phase arm of a waveshaper phase leg provides a secondary AC terminal for a corresponding AC phase and linked to the primary AC terminal of the corresponding valve phase leg, where the upper waveshaper phase arm of a waveshaper phase leg is configured to be operated in conjunction with the upper valve phase arm of the corresponding valve phase leg and the lower waveshaper phase arm of a waveshaper phase leg is configured to be operated in conjunction with the lower valve phase arm of the corresponding valve phase leg, for forming of an AC waveform at least during steady state operation, the method comprising controlling each waveshaper phase leg and valve phase leg for forming a number of phases of an output AC voltage, where the voltage of one phase is formed on the primary and secondary AC terminals of a pair of valve and waveshaper phase legs through alternately operating the valve of the upper valve phase arm and the cells of the corresponding upper waveshaper phase arm with the valve of the lower valve phase arm and cells of the corresponding lower waveshaper phase arm, thereby allowing one waveshaper phase arm in each phase to be available for use for other purposes, the method further comprising controlling at least one of the available waveshaper phase arms to contribute to other aspects of converter operation than waveshaping.

The object is also achieved by a computer program product for a voltage source converter having two DC terminals and a number of AC terminals for providing a number of phases of an AC voltage, the converter comprising a number of director valves connected in series between the DC terminals, the director valves being provided in pairs, where each pair forms a valve phase leg comprising an upper and a lower valve phase arm, where the junction between the two valve phase arms of a valve phase leg provides a primary AC terminal for a corresponding AC phase and a number of multilevel cells connected in series between the DC terminals, the cells being grouped in waveshaper phase legs, where each waveshaper phase leg is connected in parallel with a corresponding valve phase leg and comprises an upper and a lower waveshaper phase arm, where the junction between the upper and lower waveshaper phase arm of a waveshaper phase leg provides a secondary AC terminal for a corresponding AC phase and linked to the primary AC terminal of the corresponding valve phase leg, where the upper waveshaper phase arm of a waveshaper phase leg is configured to be operated in conjunction with the upper valve phase arm of the corresponding valve phase leg and the lower waveshaper phase arm of a waveshaper phase leg is configured to be operated in conjunction with the lower valve phase arm of the corresponding valve phase leg, for forming of an AC waveform at least during steady state operation, the computer program product being provided on a data carrier and comprising computer program code, which when run by a processor causes the processor to control each waveshaper phase leg and valve phase leg for forming a number of phases of an output AC voltage, where the voltage of one phase is formed on the primary and secondary AC terminals of a pair of valve and waveshaper phase legs through alternately operating the valve of the upper valve phase arm and the cells of the corresponding upper waveshaper phase arm with the valve of the lower valve phase arm and cells of the corresponding lower waveshaper phase arm, thereby allowing one waveshaper phase arm in each phase to be available for use for other purposes, wherein the computer program product is further configured to cause the processor to control at least one of the available waveshaper phase arms to contribute to other aspects of converter operation than waveshaping.

The present invention has a number of advantages. The AC and DC voltages are decoupled from each other, which allows reactive power control to be performed. Furthermore DC voltage ripple (6n harmonics) may also be compensated. Thereby passive DC filters can be made simpler or even completely removed.

BRIEF DESCRIPTION OF THE DRAWINGS

The present invention will in the following be described with reference being made to the accompanying drawings, where FIG. 1 schematically shows a voltage source converter according to one variation of the invention, FIG. 2 schematically shows arm voltages of active waveshaper phase arms of the voltage source converter as well as the sum of these active waveshaper phase arm voltages.

DETAILED DESCRIPTION OF THE INVENTION

In the following, a detailed description of preferred embodiments of the invention will be given.

Figure 1:
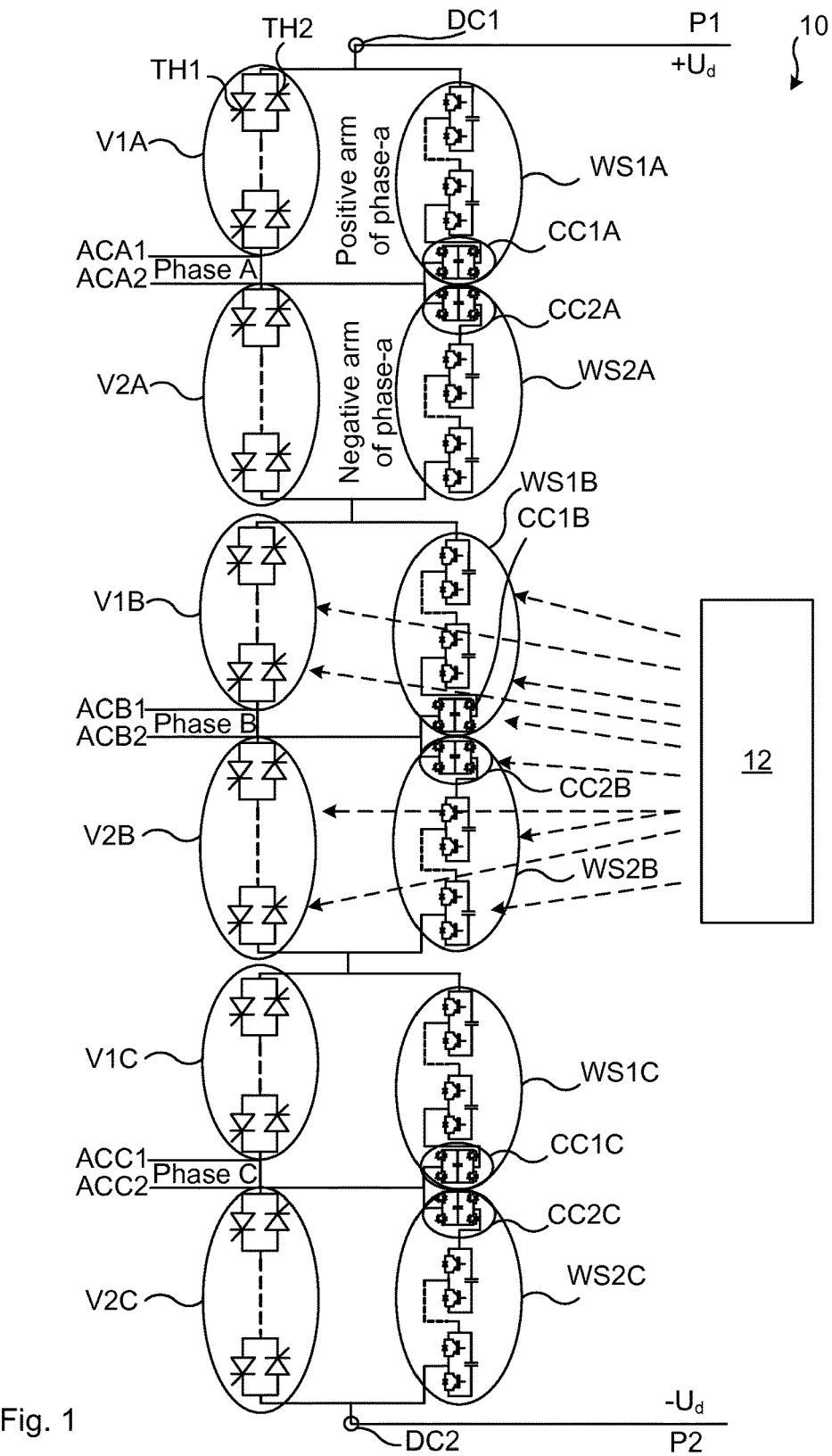

FIG. 1 shows a converter 10 according to one variation of the invention. The converter 10 may with advantage be provided as an interface between a High Voltage Direct Current (HVDC) network and an alternating current (AC) network, where the HVDC network may operate at voltage levels of 400 kV and above. The converter 10 comprises a number of phase legs. There are in this case three director valve phase legs and three waveshaper phase legs. These are furthermore provided in pairs, where a director valve phase leg and a waveshaper phase leg forms a pair. There is therefore a pair of first phase legs, a pair of second phase legs and a pair of third phase legs, where each pair is provided for a corresponding AC phase. The director valve phase legs are more particularly connected in series between a first and a second direct Current (DC) terminal DC1 and DC2, which are in this case each connected to a corresponding (DC) pole P1 and P2, where a first pole P1 has a first voltage $+U_d$ and a second pole P2 has a second voltage $-U_d$. Also the waveshaper phase legs are connected in series between the two DC terminals DC1 and DC2. In the example give in FIG. 1, there are thus three director valve phase legs and three waveshaper phase legs and consequently also three AC phases.

Each director valve phase leg comprises two valves: an upper valve V1A, V1B and V1C and a lower valve V2A, V2B and V2C, where the upper valve is provided in an upper phase arm and the lower valve is provided in a lower phase arm. Thereby the director valves are likewise provided in pairs, where each pair forms a valve phase leg comprising an upper and a lower valve phase arm. The junction between two valve phase arms of a phase leg furthermore provides a primary AC terminal ACA1, ACB1 and ACC1 for a corresponding AC phase. As can be seen in FIG. 1, the director valves are provided in the form of thyristors. Each valve may with advantage be provided in the form of at least one pair of anti-parallel thyristors TH1 and TH2. It should however be realized that as an alternative transistors, such as Insulated Gate Bipolar Transistors (IGBTs), may be used.

In a similar manner the waveshaper phase legs also comprise two phase arms each, an upper phase arm WS1A, WS1B and WS1C and a lower phase arm WS2A, WS2B and WS2C, where each phase arm comprises a string of multi-level cells. In the example in FIG. 1 the majority of the cells are half-bridge cells comprising a cell capacitor and configured to either provide a zero voltage or a unipolar voltage corresponding to the voltage across a cell capacitor. However one cell is a full-bridge cell also having a capacitor and having a zero and bipolar voltage contribution capability. The full-bridge cell is here a commutation cell. In FIG. 1 each waveshaper phase arm comprises a commutation cell CC1A, CC2A, CC1B, CC2B, CC1C and CC2C. It should be noted that it is also possible to replace one or more of the half-bridge cells in a string with full-bridge cells.

The waveshaper phase legs are connected in parallel with the director valve phase legs. This means that each waveshaper phase leg is connected in parallel with a corresponding director valve phase leg.

Furthermore the junction between the upper and lower waveshaper phase arm of a waveshaper phase leg provides a secondary AC terminal ACA2, ACB2 and ACC2 for a corresponding AC phase, where the secondary AC terminal of a waveshaper phase leg is thereby linked to the primary AC terminal of the corresponding director valve phase leg in that they together provide an AC phase voltage.

As can be seen in FIG. 1 there are thus three director valve phase legs connected in series between the two DC terminals DC1 and DC2 and three waveshaper phase legs also connected in series between the two DC terminals DC1 and DC2, where a first director valve phase leg is connected in parallel with a first waveshaper phase leg, a second director valve phase leg is connected in parallel with a second waveshaper phase leg and a third director valve phase leg is connected in parallel with a third waveshaper phase leg. There is in the first phase leg pair an upper director valve V1A and an upper waveshaper phase arm WS1A as well as a lower director valve V2A and a lower waveshaper phase arm WS2A, where the junction between the upper and lower valve phase arms V1A and V2A forms the primary AC terminal ACA1 for a first AC phase and the junction between the upper and lower waveshaper phase arms WS1A and WS2A forms the secondary AC terminal ACA2 for the first AC phase. In a similar manner there is in the second phase leg pair an upper director valve V1B and an upper waveshaper phase arm WS1B as well as a lower director valve V2B and a lower waveshaper phase arm WS2B, where the junction between the upper and lower valve phase arms V1B and V2B forms the primary AC terminal ACB1 for a second AC phase and the junction between the upper and lower waveshaper phase arms WS1B and WS2B forms the secondary AC terminal ACB2 for the second AC phase. There is in the third phase leg pair an upper director valve V1C and an upper waveshaper phase arm WS1C as well as a lower director valve V2C and a lower waveshaper phase arm WS2C, where the junction between the upper and lower valve phase arms V1C and V2C forms the primary AC terminal ACC1 for the third AC phase and the junction between the upper and lower waveshaper phase arms WS1C and WS2C forms the secondary AC terminal ACC2 for the third AC phase.

In order to control the operation of the various valves and cells, there is provided a control unit 12. In FIG. 1 the control provided by the control unit 12 is indicated through dashed arrows pointing to the thyristors in the second director valve phase leg and to the cells in the second waveshaper phase leg. It should however be realized that the same type of control is provided for all the phase legs.

Furthermore in the converter 10 in FIG. 1, there may be provided a number of additional components. The AC phase terminals may, as is well known in the art, be connected to transformers and circuit breakers. The phase arms may be connected to reactors. There may also be reactors connected between the phase leg midpoints and the above described transformers. Furthermore, there may also be surge arresters connected in parallel between the two DC poles.

The converter 10 is in steady state controlled to provide a three phase AC voltage on the three pairs of AC terminals ACA1, ACA2, ACB1, ACB2, ACC1 and ACC2 and a first and second DC voltage on the two DC terminals DC1 and DC2. Therefore the control unit 12 controls the upper waveshaper phase arm of a waveshaper phase leg in conjunction with the upper valve phase arm of the corresponding valve phase leg and the lower waveshaper phase arm of a waveshaper phase leg in conjunction with a lower director valve phase arms of the same phase leg in order to form a waveshape on a corresponding pair of primary and secondary AC terminals.

In the forming of a waveshape the director valve provides the direction or polarity of the wave and the waveshaper the shape. It is thereby possible to for example form a sine wave on a pair of AC terminals.

Figure 2:
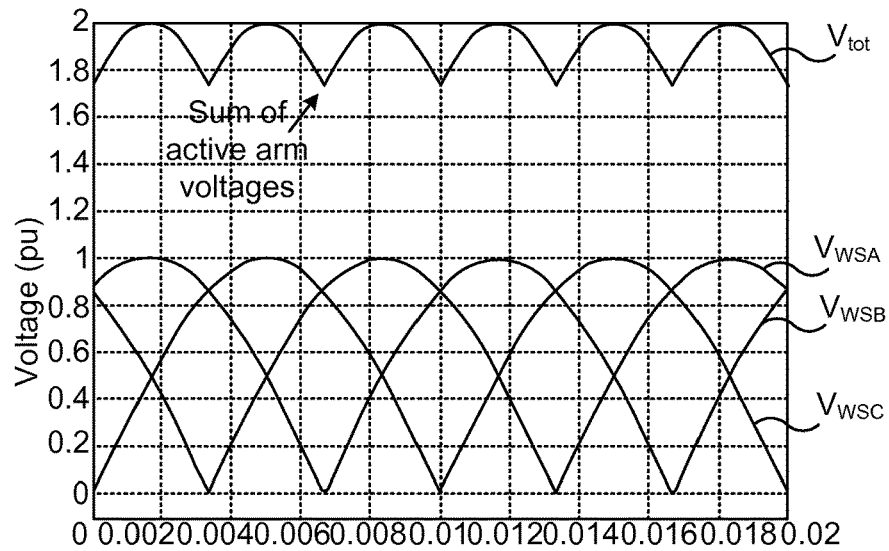

In FIG. 2 the waves $V_{WSA}$, $V_{WSB}$ and $V_{WSC}$ formed by the three waveshaper phase legs are shown. Here half of a wave is formed by the upper waveshaper phase arm and half of the lower. In for instance the wave $V_{WSA}$ formed by the first waveshaper phase leg, the first part of the wave between 0 and 0.01 s may be formed by the cells in the upper waveshaper phase arm WS1A and the second part of the wave between 0.01 and 0.02 s may be formed by the lower waveshaper phase arm WS2A. This means that between 0 and 0.01 s, the upper waveshaper phase arm WS1A is active, while between 0.01 and 0.02 s the lower wave shaper phase arm WS2A is active. Consequently, this also means that in the time interval 0.00-0.01 s the lower waveshaper phase arm WS2A is inactive with regard to AC waveshaping, while in the time interval 0.01-0.02 s the upper waveshaper phase arm WS1A is inactive with regard to waveshaping. Such an inactive phase arm is here also termed available phase arm, because it may according to variations of the invention be available for use for other purposes, i.e. other purposes than waveshaping.

It can be seen in FIG. 2 that the voltages $V_{WSA}$, $V_{WSB}$ and $V_{WSC}$ are all positive and cyclically vary between zero and 1 p.u., where p.u. denotes per unit and is a normalized AC voltage level.

As can be understood from FIG. 1 and the lower part of FIG. 2, the voltages $V_{WSA}$, $V_{WSB}$ and $V_{WSC}$ obtained from the active phase arms are summed for forming the DC voltage difference between the two poles P1 and P2. In the upper part of FIG. 2 this sum of the active phase voltages $V_{tot}$ is also shown.

In order to form these phase arm voltages the control unit 12 uses a reference voltage Vref. There is thus a reference voltage Vrefa for the first phase, a reference voltage Vrefb for the second phase and a reference voltage Vrefc for the third phase, where the reference voltage is the reference voltage used for forming the AC waveshape in steady state operation. This type of reference signal generation and control is as such known in the art.

As can also be seen in FIG. 2, the different waveshape phase leg voltages are all positive. The director valves are in this case used for changing the polarity in order to provide a waveform that is centered around zero.

This also means that the reference voltages for the waveshaper phase legs may be expressed as |Vrefa|, |Vrefb| and |Vrefc|.

When the director valves are provided in the form of thyristors, these cannot be turned off in the same ways as ordinary switches, but another scheme has to be used.

The commutation cells CC1A and CC2A are in this respect provided for turning off the thyristor-based director valves. Turning off of a thyristor-based director valve is done through controlling the commutation cell to provide a negative voltage that is applied across the director valve, i.e. to reverse-bias the director valve, which in turn causes the valve to stop conducting.

If all three phase thyristors are switched based on wave shaper voltage, the peak of the arm voltage of the converter in FIG. 1 is $$\frac{\pi}{6}$$

$2U_d$ and the average of the three phase voltages forms the DC link voltage at the DC side of the converter, which is the difference between the voltages of the two poles P1 and P2. In this case, each arm is designed for a voltage peak of $$\frac{\pi}{6}$$

$2U_d$. The instantaneous summation of three active phases is varying from $$1.732 * \frac{\pi}{6} 2U_d \text{ to } 2 * \frac{\pi}{6} 2U_d$$

as can be seen in the curve $V_{tot}$ in FIG. 2.

The above disclosed relationships may be valid only for steady state and fixed AC voltage. However, if the AC voltage varies, the average DC voltage is also changed.

Therefore in steady state converter operation, the DC voltage average is fixed as the AC peak value times 6/π. Thus the average DC voltage will also change when the AC voltage varies. The AC voltage and DC voltage are thus coupled to each other and thereby reactive power control is not possible. This is a serious drawback, since reactive power compensation is a feature that is important in many situations, for instance if the converter is connected to a windfarm.

The coupling of the AC voltage to the DC voltage may also lead to negative consequences in various fault handling situations.

If there is an external AC fault, for instance an AC fault in an AC network to which a converter station comprising the converter of FIG. 1 is connected, then the AC voltage at the AC terminals of the converter may collapse. In this case it is not possible for the converter to provide fault ride-through. It is also impossible to support active and reactive power during AC bus fault.

As was mentioned earlier, in the converter steady state operation an instantaneous summation of three active phases voltage will appear on the DC side. The DC voltage will comprise 6n harmonics which can be eliminated by passive filters. However passive DC filters are bulky and occupy significant space.

The invention is directed towards decoupling the DC voltage from the AC voltage. Thereby it is possible to inject reactive power into an AC network. It is also possible to obtain AC fault ride-through.

In some instances the performed decoupling also enables a reduction of the above-mentioned 6n harmonics, which reduces or even completely removes the need for filtering.

It can be understood from the above made description that at every instance in time only one of the two phase arms of a phase leg is used for waveshape forming. This in turn means that the non-used waveshaper phase arm is available and may be used for other purposes. If the generated AC voltage is a three-phase voltage, then there are three available waveshaper phase arms at every time instance. According to some aspects of the invention at least one of the available waveshaper phase arms is controlled to contribute to other aspects of converter operation than waveshaping.

This is according to the invention used for decoupling the DC voltage from the AC voltage. Thereby it is possible to improve operation in steady state as well as in various types of fault handling situations.

As can be seen in FIG. 2, the instantaneous summation of three active phases is varying from $$1.732 * \frac{\pi}{6} 2U_d \text{ to } 2 * \frac{\pi}{6} 2U_d.$$

Furthermore, the AC voltage and DC voltage are tightly coupled to each other. An AC voltage variation is not possible to obtain unless the DC voltage is changed.

In order to decouple the AC voltage from the DC voltage, the invention proposes the use of the available inactive arms. At any instant, three inactive arms are available. Any of these may be controlled for decoupling the DC voltage from the AC voltage. This control also has the advantage of removing the 6n harmonics. Such control may with advantage be performed during steady state operation of the converter.

According to variations of the invention, the control involves controlling at least one of the available phase arms according to $$rpa1 = rpa2 = \frac{2U_d - \{|V_{refa}| + |V_{refb}| + |V_{refc}|\}}{2} \tag{1}$$

where rpa1 is a control or reference voltage signal for the upper waveshaper phase arm of the first phase leg if it is available and rpa2 is a control or reference voltage signal for the lower waveshaper phase arm of the first phase leg if it is available.

Similar control signals may be provided for the other phase legs.

The denominator of equation (1) is here set to be a value that is the number of available phase arms simultaneously used in the control, i.e. used for other purposes than waveshaping. As can be seen two arms are simultaneously used in the example of equation (1). In case only one available phase arm is used there would be a denominator of 1 or no denominator and in case three available phase arms were used the denominator would be set to 3.

Figure 3:
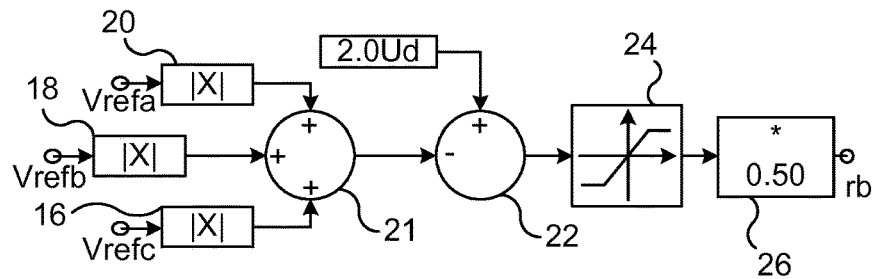
FIG. 3 shows a block schematic of a control block used for controlling an available phase arm, FIG. 4 schematically shows the active AC voltages of the different active phase arms together with contributions made by corresponding available phase arms during steady state operation of the converter.

One way of realizing a control block in the control unit for implementing the control signal for a phase arm is shown in FIG. 3.

As can be seen in FIG. 3, there are three absolute value forming elements 16, 18 and 20 each receiving a corresponding phase leg reference voltage Vrefa, Vrefb and Vrefc and forming the absolute value of such a reference voltage. These elements are in turn connected to an adding element 21 for adding the absolute values to each other. In an element 22, the sum of the absolute values is then subtracted from the difference between the pole voltages 2Ud. The result is supplied to a value range limiting element 24 and then the result of the value range limitation is divided by 0.5 in a dividing element 26 in order to provide a basic reference signal $r_b$. This basic reference signal $r_b$ is in this specific case the same as the control signal $r_{pa1}$ of equation (1).

This means that a waveshaper phase arm will alternately be controlled using a reference signal Va and the above mentioned control signal $r_{pa1}$. As can be seen the control value controls an available waveshaper phase arm voltage towards a target phase arm voltage using a control value $r_{pa1}$ or $r_{pa2}$, where the control value is based on a sum of the absolute values of the reference voltages used for waveshaping in the three waveshaper phase legs, i.e. the reference voltages used in the three active phase arms. The control value is more particularly based on a difference between a DC voltage value 2Ud and the sum of absolute values of the reference voltages, where the DC voltage value is the difference between the voltages $+U_d$ and $-U_d$ on the two DC terminals. It can also be seen that the difference between the DC voltage value $2U_d$ and the sum of absolute values is divided by a value corresponding to the number simultaneously used available phase arms, here two. The control signal used is thus a control signal that is based on the difference between the DC side voltage of the converter and the sum of the absolute values of the phase voltage reference signals.

Figure 4:
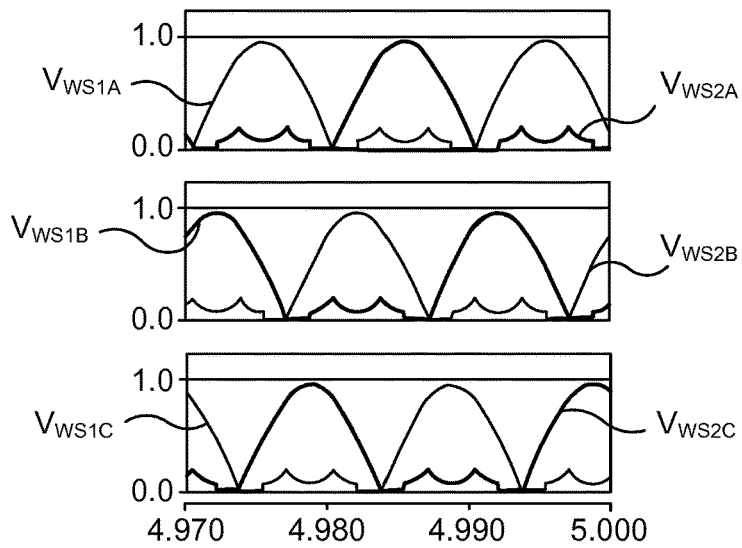
Figure 5A:
FIGS. 5A and 5B shows the waveshaper phase arm voltages of a first waveshaper phase leg.
Figure 5B:
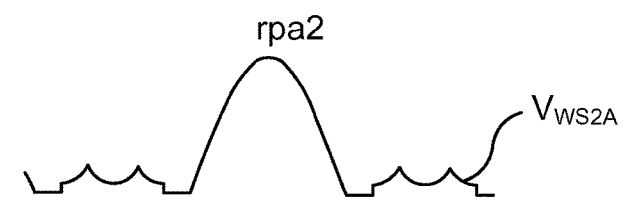

FIG. 4 shows the different phase arm voltages for the three phases, where the active arm voltages are shown together with the available arm voltages. In the upper part of the figure the upper waveformer phase arm voltage $V_{WS1A}$ and lower waveformer phase arm voltage $V_{WS2A}$ of the first phase leg are shown, Below these two voltages the same phase arm voltages $V_{WS1B}$ and $V_{WS2B}$ of the second phase and arm voltages $V_{WS1C}$ and $V_{WS1C}$ of the third phase are shown. The active arm voltage is alternately provided by the upper and lower phase arm and the available arm voltage is alternately provided by the lower and upper phase arm. This is in FIG. 4 indicated through making one of the waves thicker than the other. This relationship is more clearly shown in FIG. 5A, which shows the voltage $V_{WS1A}$ provided by the upper waveshaper phase arm of the first waveshaper phase leg and in FIG. 5B, which shows the voltage $V_{WS2A}$ provided by the lower wayshaper phase arm of the first waveshaper phase leg. As can be clearly seen the different phase arms are alternately used for control towards the reference voltage Varef and the control voltage $r_{pa1}$ or $r_{pa2}$.

Under conventional steady state operation, 6n voltage harmonics appear in the DC link. So, in this case a DC filter was traditionally required to block the 6n harmonic currents. According to the principles described herein to avoid passive DC filters and decouple AC and DC voltage, inactive arms produce the remaining voltage (some part of the DC voltage and 6n harmonic voltage) to make the instantaneous sum of all the phase voltages as the DC pole to pole voltage (2Udc). The remaining DC voltage serves the purpose of modulation index as compared to other types of converter topologies.

As mentioned above, the above described control scheme may also be used in various other situations, such as in relation to transient like AC faults. It is for instance possible that the sum of the separate AC phase voltages falls with a factor that is proportional to the intensity of fault. As the DC voltage of the converter is equal to the sum of the rectified AC phase voltages, a three phase AC fault leading to the AC voltage falling to a level with an exemplifying 10% remaining voltage will lead to also the DC voltage being reduced to a 10% level, i.e. $0.1*2U_d$, in conventional control.

One way to compensate the loss in DC voltage is also here to use the available or inactive arms. As before there are three inactive arms. In this case any two of the available phase arms can be used for this purpose. The reason for only allowing two to be used may be due the commutation being performed. This principle may furthermore be generalized in the following way. If the number of available phase arms is n, then the control unit is configured to control a maximum of (n−1) available waveshaper phase arms to contribute to the other aspects of converter operation.

One of the requirements for commutation is to maintain zero voltage on both upper arm and lower arm. So the third inactive arm can be kept at a zero voltage to create a commutation environment during a commutation instant. The three inactive arm operations may be rotated based on AC voltage waveform as given in FIG. 6.

One of the requirements for thyristor commutation is zero voltage across both upper and lower arm for a particular phase during commutation. So the inactive arm which is close to commutation instant will be kept at a zero voltage. The other two inactive arms will be used to compensate loss in DC voltage average due to AC voltage faults. Normally thyristor commutation is initiated during zero crossing of a particular AC phase voltage.

If for instance the upper waveformer phase arm of the upper phase leg is supposed to have
Active arm period: 0° to 180°
Inactive arm period: 180° to 360°
where the commutation instant for the first phase would be at 180° and 360° so the available phase arm of the phase leg should be kept at a zero voltage during these instants.

$$rpa1 = 0.0 \quad \left\{ \begin{array}{l} \text{for } 180° \text{ to } 210° \\ \text{for } 330° \text{ to } 360° \end{array} \right\} \quad (2)$$

$$rpa1 = \frac{2U_d - \{|V_{refa}| + |V_{refb}| + |V_{refc}|\}}{2} \quad \left\{ \begin{array}{l} \text{for } 210° \text{ to } 270° \\ \text{for } 270° \text{ to } 330° \end{array} \right\} \quad (3)$$

This can be stated in a different way. An available phase arm may be available in an availability period, which in the example given above would be the inactive arm period of 180-360 degrees. However, in this period the control unit controls this available waveshaper phase arm to contribute to the converter operation after the start and before the end of the availability period. The start of control of the available phase arm is thus delayed from the start of the availability time interval, which in this example is a delay with 30°. Likewise the control is ended before or ahead of the end of the availability interval, which in this example is an ending 30° ahead of the end of the availability interval.

Figure 6:
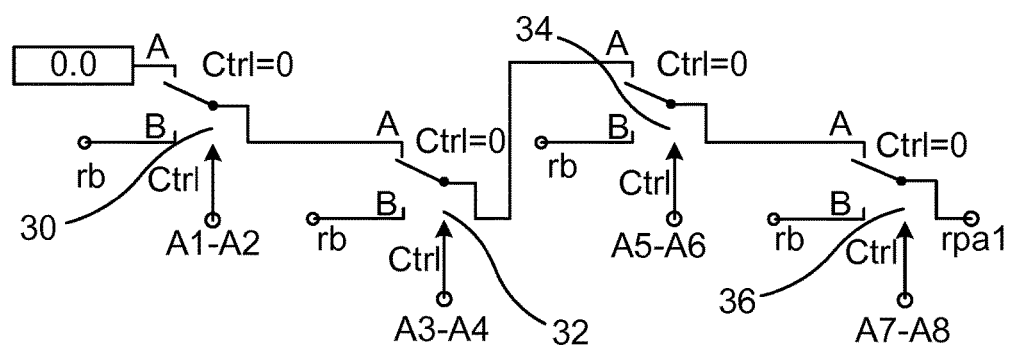
FIG. 6 shows a block schematic of a control block to be used in conjunction with the control block in FIG. 3 in order to control a phase arm in relation to AC faults, FIG. 7 schematically shows the waveformer phase arm voltages with a 10% remaining AC voltage, FIG. 8 schematically shows the waveformer phase arm voltages during a single phase AC fault with a 10% remaining voltage, FIG. 9 schematically shows the operation of the converter with half-bridge cells for handling an AC converter bus fault on the first phase, FIG. 10 schematically shows the operation of the converter with full-bridge cells for handling an AC converter bus fault on the first phase.

FIG. 6 shows one way of implementing a control block in the control unit for controlling a waveshaper phase arm, which control block considers the required commutation and uses the basic control signal $r_b$ obtained from the control block depicted in FIG. 3.

In FIG. 6, which it has to emphasized is merely one exemplifying realization of the control block, there is a first switch 30 having a first terminal with a voltage of 0 V and a second terminal that receives the basic control signal or basic reference voltage $r_b$. The output of the first switch 30 is connected to a first input of a second switch 32, which second switch has a second input to which the basic reference voltage $r_b$ is also supplied. The output of the second switch 32 is in turn connected to a first input of a third switch 34, which has a second input to which the basic reference signal $r_b$ is also supplied. Finally the output of the third switch 34 is connected to a first input of a fourth switch 36, having a second input on which the basic reference signal rb is also supplied. The first switch 30 is here set to be connected to the second input between a first and a second angle A1 and A2 and otherwise to the first terminal, the second switch 32 is set to be connected to the second terminal between a third and a fourth angle A3 and A4 and otherwise to the first terminal. The third switch 34 is set to be connected to the first terminal between the a fifth and a sixth angle A5 and A6 and otherwise to the first terminal and the fourth switch is finally set to be connected to the first terminal for a seventh and an eighth angle A7 and A8 and otherwise to the first terminal.

As an example A1=210°, A2=240°, A3=240°, A4=270°, A5=270°, A6=300°, A7=300° and A8=330°. As can be seen A2=A3, A4=A5 and A6=A7.

It can also be seen that between angles A1 and A2 the reference signal $r_b$ is supplied from the first switch 30 to the second switch 32 and all the way to the output of the control block, at other angles a zero signal is supplied by the first switch 30. It can also be seen that between the angles A3 and A4, the second switch 32 provides the basic reference signal $r_b$ and at other angles the signal provided by the first switch 30. In a similar manner it can be seen that the third switch 34 provides the basic reference signal $r_b$ between the angles A5 and A6 and at other angles the signal supplied by the second switch 32. Finally it can be seen that the fourth switch 36 provides the reference signal $r_b$ between the angles A7 and A8 and that at other angles the signal provided by the third switch 34.

It can thus be seen that in the intervals A1-A2, A3-A4, A5-A6 and A7-A8, the basic reference signal $r_b$ is provided at the control block output. Between the angles A1 and A2, the first switch 30 provides the control signal. Between the angles A3 and A4 the control signal is in turn supplied by the second switch to the output, between the angles A4 and A5 the control signal supplied to the third switch 34 is used and finally between angles A7 and A8 the control signal from the fourth switch 36 is used. It can be seen that if A2=A3, A4=A5 and A6=A7, then the reference signal $r_b$ will be generated for the angles A1-A8. It can also be seen that for the example given above, equation (3) is fulfilled when A1=210 and A8=330 and thus the control signal being output is the same as the signal in equation (3).

Figure 7:
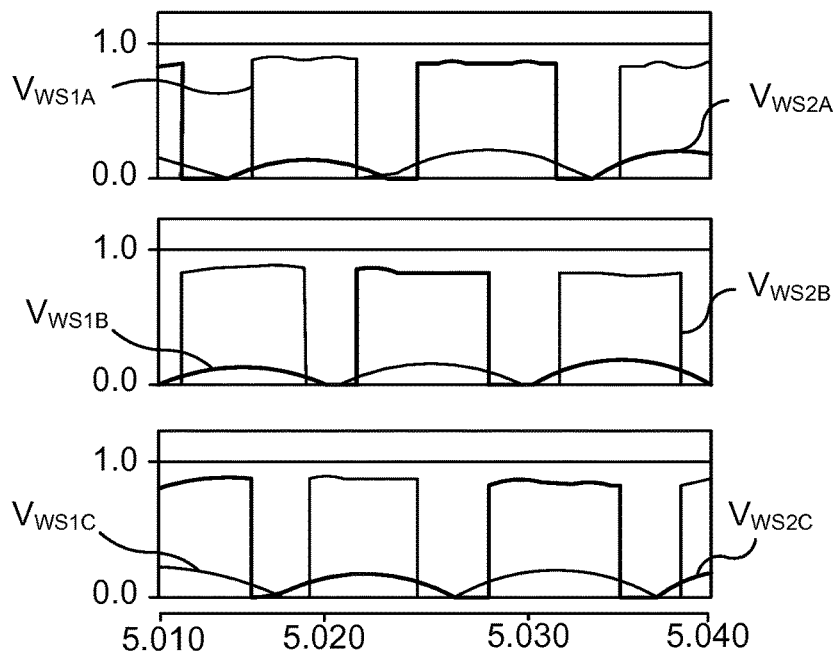
Figure 8:
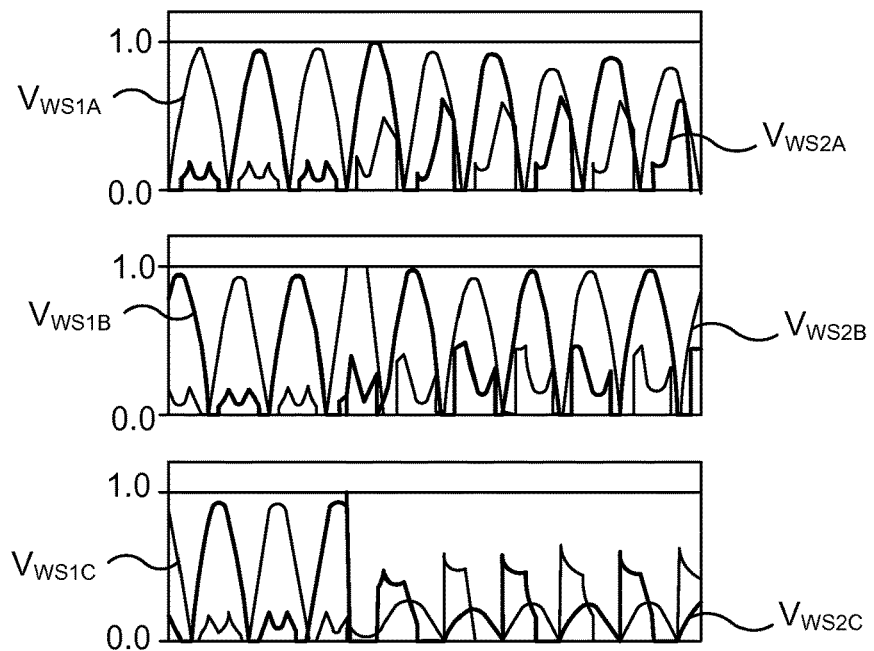

FIG. 7 shows the waveshaper signals in the different phase legs when there is a three-phase fault reducing the AC voltage to 10% of its nominal value and FIG. 8 shows the same voltages for a single phase fault on the third AC phase. In both cases the above described control has been used. It can also be noted that the contribution from the available phase arms is considerably higher than in the steady state case.

Figure 9:
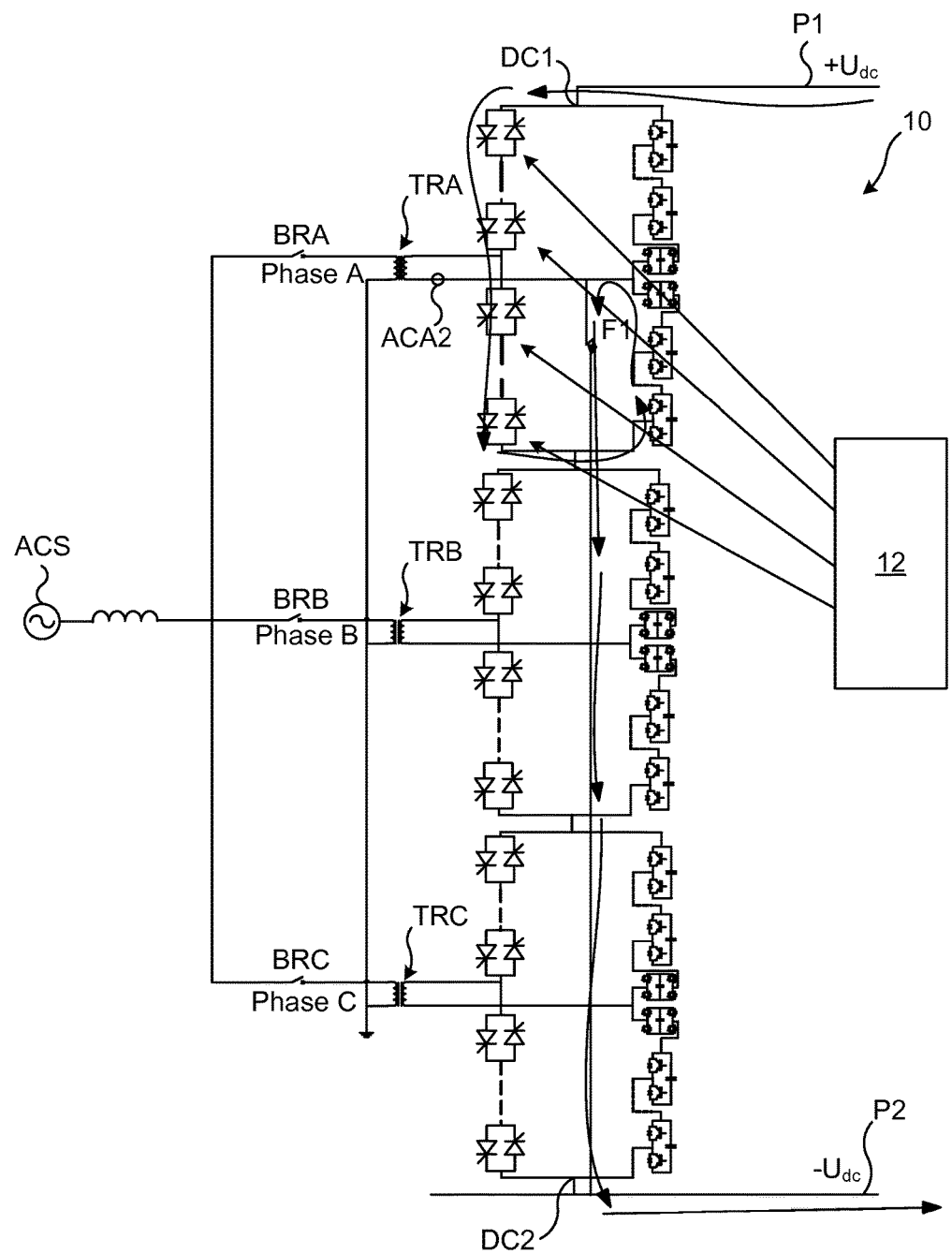

FIG. 9 shows an example of the handling of an AC converter bus fault of the converter 10. FIG. 9 essentially shows the same converter as in FIG. 1, where the cells are half-bridge cells. It can be seen in FIG. 9 that a number of transformers TRA, TRB and TRC are provided. These each have a primary side connected to an AC source ACS via a corresponding circuit breaker BRA, BRB and BRC and a secondary side connected between the primary and secondary AC phase terminal of the corresponding director valve and waveshaper phase legs.

Single phase faults may also occur internally in the converter station comprising the converter 10 between an external AC network and the converter, such as in an AC line of a converter bus. These kinds of faults may also need to be handled. The handling of the faults may then depend on the cell types used in of waveshaper phase legs.

FIG. 9 more particularly shows the handling of such a fault F1 on the first phase between the secondary terminal ACA2 of the first waveshaper phase leg and the connected transformer TRA.

When such a fault F1 is detected, the control unit 12 blocks all the cells. It also controls all the valves of the valve phase leg connected to the faulty phase to be turned on or conducting while at the same time turning off or blocking the other valves. The thyristor switches of the valves in the phase legs connected to the healthy phases are thus opened or blocked. The control unit thus controls the valves of a valve phase leg to be turned on in the case of a fault on an AC line connected to the AC terminal pair of the valve phase leg. In this case the control unit furthermore only controls the valves of the valve phase leg connected to the phase with the fault to be turned on while the other valves are turned off.

The fault current will in this case flow from the first pole P1 towards the first DC terminal DC1 of the converter 10. The fault current will then flow through the thyristors of the upper and lower director valves of the first phase leg, thereby avoiding over-charging of the upper waveshaper arm cells in the first waveshaper phase leg. Then the fault current is redirected to the diodes of the lower arm of the first waveshaper phase leg and thereafter via the fault path F1 to the second pole P2. The diodes should handle this fault current for 3 cycles which is dictated by AC breaker trip. Once the AC breaker BRA is tripped there is no source for fault and fault current will be zero. The diode surge current rating in the arm should be defined by the maximum fault current.

In case the cells of the waveshaper phase legs are full-bridge cells, a somewhat different control may be performed for the same fault.

Figure 10:
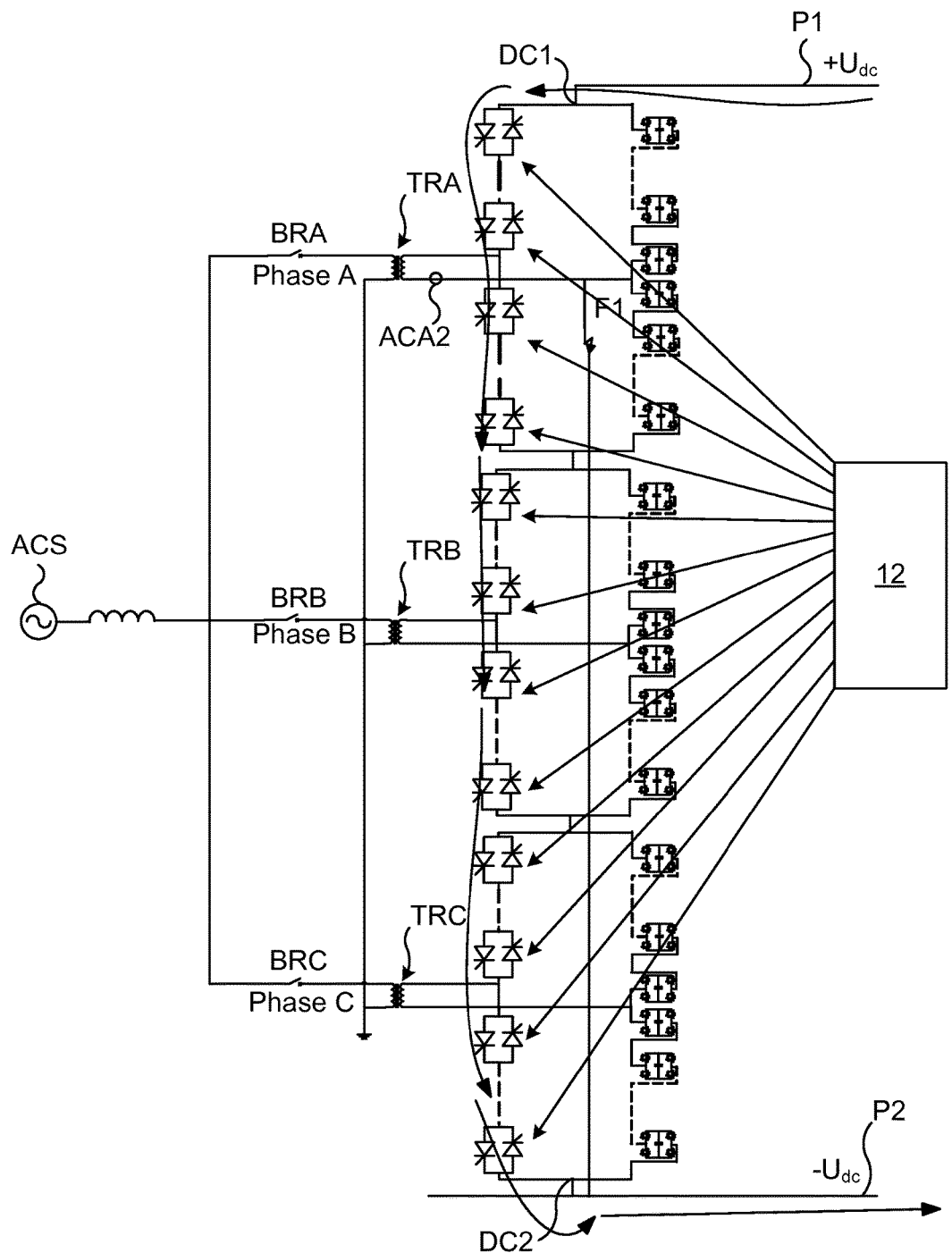

This case is shown in FIG. 10, which likewise shows the handling of an AC converter bus fault on the first phase. Unlike half-bridge cells, full-bridge cells are charged independently of the current direction through them. So the fault current cannot be bypassed through the cells of the lower waveshaper phase arm of the first waveshaper phase leg. The entire thyristor arm should thus be bypassed to avoid over-charging of any arm. In this case the control unit therefore blocks all cells and also controls all thyristor switches to be closed All the valves that are series-connected between the two poles P1 and P2 are thus in this case to be turned on and conducting.

Figure 11:
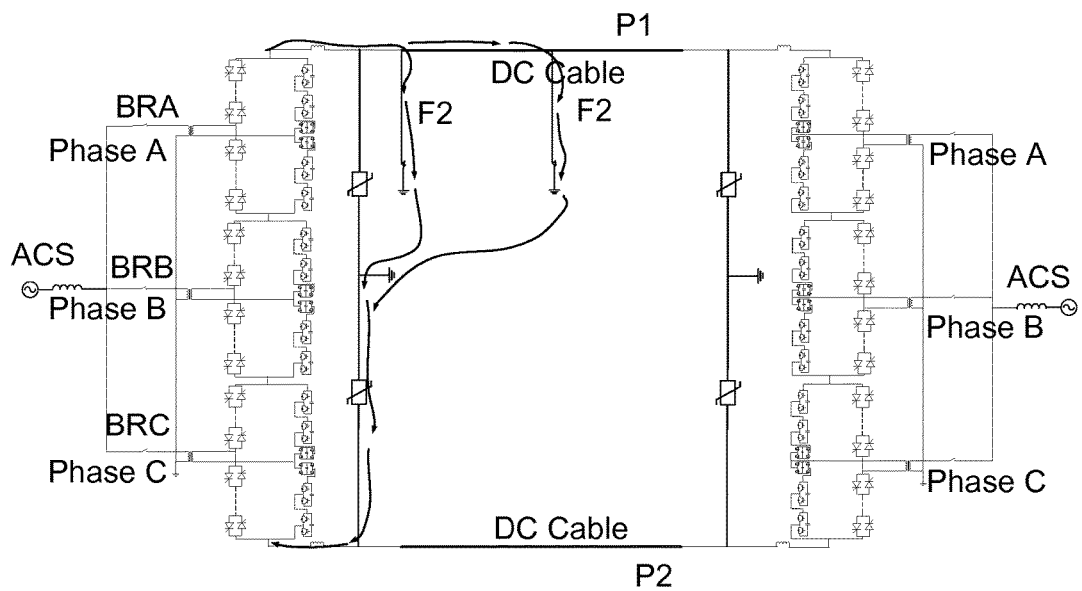
FIG. 11 shows a converter with half-bridge cells when handling a DC pole fault.
Figure 12:
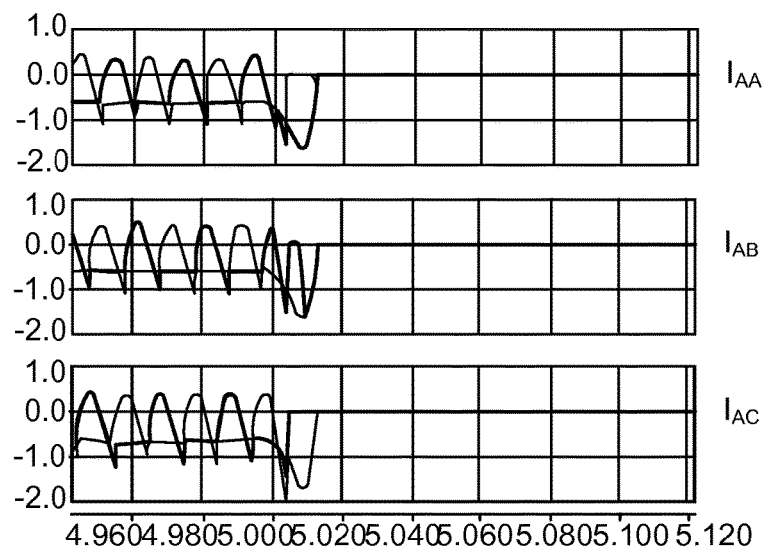
FIG. 12 shows the arm currents when handling the DC pole fault in the converter with half-bridge cells.

The handling of DC faults for a converter using half-bridge cells will now be described with reference to FIGS. 11 and 12, where FIG. 11 shows two converter stations interconnected with each other via a DC cable comprising the first and the second pole P1 and P2. In this case each converter comprises a series-connection of surge arresters between the two poles, with the midpoint grounded. Also the transformers are shown connected between the AC source ACS via circuit breakers BRA, BRB and BRC and each of the phase leg pairs. It can also be seen that a fault F2 is assumed to occur on the first pole P1. FIG. 12 shows the arm currents $I_{AA}$, $I_{AB}$ and $I_{AC}$ in the different waveshaper phase arms, where the upper curve shows the currents $I_{AA}$ in the upper and lower waveshaper phase arm of the first waveshaper phase leg, the curve in the middle shows the currents $I_{AB}$ in the upper and lower waveshaper phase arm of the second waveshaper phase leg and the lowest curve shows the currents $I_{AC}$ in the upper and lower waveshaper phase arm of the third waveshaper phase leg. The current that is provided by an active phase arm has an essentially cyclic shape, while the current in an available phase arm has an essentially linear shape.

In this case the control unit 12 of the converter 10 blocks the cells. Thereby the anti-parallel thyristor controls the current under DC link fault by using a blocking signal. After 1 ms (fault detecting time) thyristor blocking signals are sent to the thyristors by the control unit 12. However, the thyristors continue to conduct until there is a natural zero current in the AC current supplied from the AC source ACS. Once there is a zero crossing of the AC current, the next thyristor will not be fired. The fault current driven by the AC source ACS is then blocked by the converter 10. However, there is current trapped in the cell capacitors. This trapped current gets a path through the anti-parallel diodes of the half-bridge cells and via the fault F2 to the second pole P2. The trapped current is in FIG. 12 indicated through the swing at the end of the available phase arm currents.

In this fault caser it can thus be seen that the control unit 12 turns off the valves after detection of a pole fault and then keeps them turned off until after fault clearance.

If the trapped current needs to be blocked, then full-bridge cells or a mechanical based LC oscillation DC breaker may be used instead. It is in many cases not mandatory to remove the trapped current. For instance in relation to DC cables, since no DC fault recovery operation for the DC cable fault is necessary. Converter AC breakers BRA, BRB and BRC are opened at both end and converter will be shut down until the DC cable fault is identified and removed. Thus for instance offshore HVDC projects where DC cable is only choice, a half bridge cell serves the purpose.

Full bridge cell or half-bridge cell with mechanical based LC oscillation breaker options should be required if over-headlines and DC fault recovery scheme is essential. If a DC breaker is not required, performance is similar to FB based parallel converter.

Figure 13:
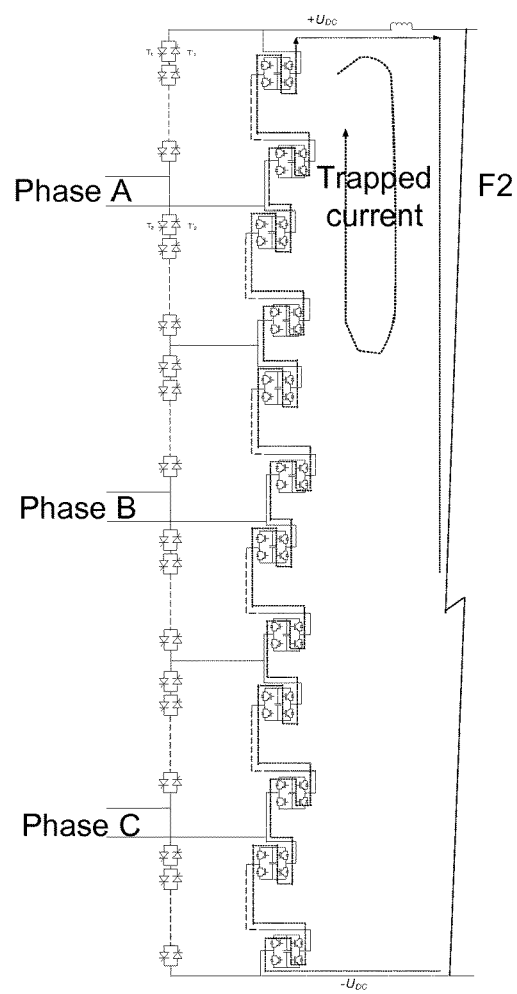
FIG. 13 shows a converter with full-bridge cells when handling a DC pole fault.

The current paths under DC-link fault when the cells are full-bridge cells are shown in FIG. 13. One component of the fault current is flowing from the AC source ACS through the thyristor and fault path. The other component of the fault current (which is known as the trapped current) is flowing through the cell capacitor and fault path. Once fault F2 is detected, director valve thyristors are not fired. The fault current continues to flow in the upper director valve and once the current reaches zero by natural AC current, the upper director valve thyristor will be turned OFF. The trapped current can be reduced quickly by blocking the cells of the wave-shaper. The cell capacitor voltage counteracts the trapped current. Note that DC breakers are not required.

There are some situation in which it is necessary to operate the converter with a reduced DC voltage, such as for instance at 80% of the nominal DC voltage. This may be necessary if there is for instance a partial failure in insulator or when there are adverse weather conditions. In conventional operation of the converter of the type in FIG. 1, 1 pu AC voltage cannot be produced when the DC link voltage is reduced because of AC and DC voltage coupling. This can be handled in two different ways.

One way to handle the problem is to use the inactive arms to obtain the required AC voltage at the reduced DC voltage.

This may be done based on the same type of available phase arm control that was described earlier.

Inactive arms will produce the difference in voltage during reduced DC voltage. Reference voltage signal generation for inactive arm for 80% DC voltage may be obtained through equation (4) below.

$$rpa1 = \frac{1.6 U_d - \{|V_{refa}| + |V_{refb}| + |V_{refc}|\}}{2} \quad \begin{Bmatrix} \text{for } 210° \text{ to } 270° \\ \text{for } 270° \text{ to } 330° \end{Bmatrix} \quad (4)$$

Figure 14:
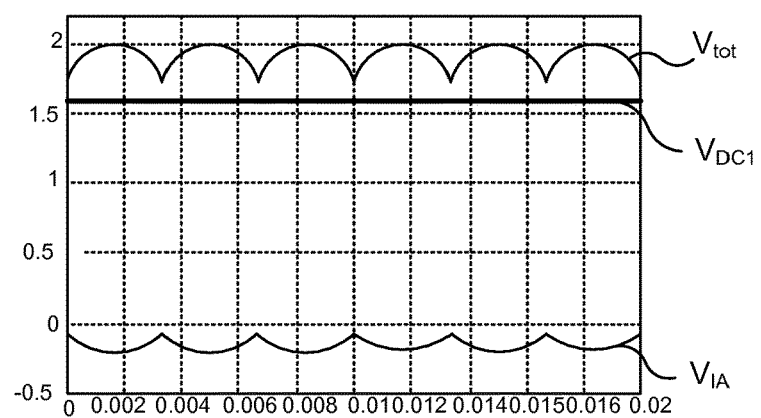
FIG. 14 shows the sum of active arm voltages the DC voltage and the available arm voltage during reduced DC voltage operation.

A pole voltage difference that is scaled down with the percentage of the reduced voltage is thus used in equation (4), where 1.6 $U_d$ corresponds to 80% of the DC voltage. If the same AC voltage (1 pu) is used, instantaneous sum of DC voltage is $$1.732 * \frac{\pi}{6} 2U_d \text{ to } 2 * \frac{\pi}{6} 2U_d$$

as shown in FIG. 2. The difference voltage should be produced by inactive arms. Inactive arm voltage $V_{IA}$ becomes negative if DC voltage is reduced as shown in FIG. 14. Negative voltages are only realizable by full-bridge cells. Two inactive arms will share the negative DC voltage including 6n harmonics.

Another way of reducing the DC voltage while at the same time retaining the nominal AC voltage is through using firing angle (α) control of the thyristors.

The DC voltage for Classic (LCC) converter station is defined by $$U_{dc} = \frac{3\sqrt{3}\sqrt{2} U_a}{\pi} \cos(\alpha)$$

where Ua is the root-mean-square (rms) voltage of a phase and α is the firing angle. Converter DC voltage can be modified by the thyristor firing angle. The firing angle varies between 0 and 180° for changing the DC voltage from +$U_d$ to −$U_d$. Zero DC voltage is obtained at a phase angle of 90°. If there is any DC fault or commutation failure of inverter station, the rectifier station firing angle may be moved to more than 90° (normally 135°) and thereby a negative DC voltage will counteract the fault current. For the reduced DC voltage operation, α may be increased such that the desired percentage of reduced operation is obtained, which percentage in this example was 80% of the steady state DC voltage.

When applied on the converter in FIG. 1, where the three phases are connected in series, the DC voltage is obtained through $$U_{dc} = \frac{\sqrt{2}\,U_a}{\pi} \cos(\alpha)$$

where $U_a$ is an rms phase voltage of a phase and a is the firing angle. By changing the firing angle of the director valve a reduced DC voltage can be obtained. This scheme can be extended to DC fault current control and fault recovery. This operation is similar to the control of a line commutated control (LCC) converter for DC fault recovery.

It can be seen that in this case the control unit controls the firing angle of the valve thyristors to reduce the DC voltage after the detection of a DC pole fault.

When this scheme is used zero voltage switching of the director valves will no longer be available. In steady state operation, the converter is operating at α=0° i.e., zero voltage switching for director valve.

The invention has a number of advantages.

According to the invention, the AC and DC voltages are decoupled from each other, which allows reactive power control to be performed. Furthermore DC voltage ripple (6n harmonics) is also compensated. Thereby passive DC filters can be made simpler or even completely removed. Furthermore also AC fault ride-through is enabled for external AC faults and reduced DC voltage operation.

Because of the way that transient internal single phase converter bus faults are handled by bypassing the director valve thyristors, overrating of upper/lower most waveshaper arms is avoided.

Further advantages that can be found comprise valve cost reduction because of series connected phases and thyristors. AC filters and passive DC filters are not required. The converter platform volume is also small.

Figure 15:
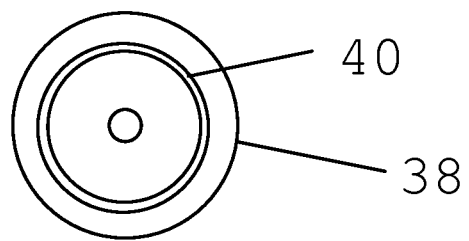
FIG. 15 shows a computer program product in the form of a CD ROM disc with computer program code implementing the functionality of the control unit.

The control unit may be realized in the form of discrete components. However, it may also be implemented in the form of a processor with accompanying program memory comprising computer program code that performs the desired control functionality when being run on the processor. A computer program product carrying this code can be provided as a data carrier such as one or more CD ROM discs or one or more memory sticks carrying the computer program code, which performs the above-described control functionality when being loaded into a processor performing the role of control unit of the voltage source converter. FIG. 15 shows on such CD ROM disc 38 with computer program code 40 implementing the functionality of the control unit.

The commutation cell was above described as being a full-bridge cell. It should however be realized that it may in some instances be a half-bridge cell.

From the foregoing discussion it is evident that the present invention can be varied in a multitude of ways. It shall consequently be realized that the present invention is only to be limited by the following claims.

The invention claimed is:

1. A voltage source converter having two DC terminals and a number of AC terminals for providing a number of phases of an AC voltage, the converter comprising:
a number of director valves connected in series between the DC terminals, the director valves being provided in pairs, where each pair forms a valve phase leg comprising an upper valve phase arm and a lower valve phase arm, where a junction between the upper and lower valve phase arms of a valve phase leg provides a primary AC terminal for a corresponding AC phase;
a number of multilevel cells connected in series between the DC terminals, the cells being grouped in waveshaper phase legs, where each waveshaper phase leg is connected in parallel with a corresponding valve phase leg and comprises an upper and a lower waveshaper phase arm, where a junction between the upper and lower waveshaper phase arms of a waveshaper phase leg provides a secondary AC terminal for a corresponding AC phase and is linked to the primary AC terminal of the corresponding valve phase leg, wherein the upper waveshaper phase arm of a waveshaper phase leg is configured to be operated in conjunction with the upper valve phase arm of the corresponding valve phase leg, and wherein the lower waveshaper phase arm of a waveshaper phase leg is configured to be operated in conjunction with the lower valve phase arm of the corresponding valve phase leg, for forming an AC waveform at least during steady state operation; and
a controller configured to control each waveshaper phase leg and valve phase leg for forming a number of phases of an output AC voltage, where the voltage of one phase is formed on the primary and secondary AC terminals of a pair of valves and waveshaper phase legs through alternately operating the valve of the upper valve phase arm and the cells of the corresponding upper waveshaper phase arm with the valve of the lower valve phase arm and cells of the corresponding lower waveshaper phase arm, thereby one waveshaper phase arm in each phase is inactive with regard to waveshaping as an available waveshaper phase arm,
wherein the controller is further configured to control at least one of the available waveshaper phase arms through controlling the waveshaper phase arm towards a target phase arm voltage using a control value that is based on a sum of absolute values of reference voltages used for waveshaping in the waveshaper phase legs.

2. The voltage source converter according to claim 1, wherein the control value is based on a difference between a DC voltage value of the DC terminals and said sum of absolute values, where the DC voltage value is a difference between the voltages on the DC terminals.

3. The voltage source converter according to claim 1, wherein the control unit is configured to control the valves of a valve phase leg to be turned on in a case of AC fault ride-through of a fault on an AC line connected to the AC terminal of the valve phase leg.

4. The voltage source converter according to claim 1, wherein the controller is configured to turn off the valves after detection of a DC pole fault and keep the valves turned off until after fault clearance.

5. The voltage source converter according to claim 4, where the controller is configured to also block the multilevel cells.

6. The voltage source converter according to claim 1, wherein each director valve comprises at least one pair of anti-parallel thyristors and each waveshaper phase arm further comprises a commutation cell controllable to reverse-bias the director valve of the corresponding valve phase arm for controlling the corresponding valve phase arm to stop conducting current.

7. The voltage source converter according to claim 6, wherein the number of the available phase arms is n and the controller when being configured to control the available waveshaper phase arms is configured to control a maximum of (n−1) of the available waveshaper phase arms.

8. The voltage source converter according to claim 6, wherein the available phase arm is available in an availability period and the controller, when being configured to control the available waveshaper phase arm, is configured to perform said control after a start and before an end of the availability period.

9. The voltage source converter according to claim 6, wherein the controller is configured to control a firing angle of the valve thyristors to reduce the DC voltage after detection of a DC pole fault.

10. The voltage source converter according to claim 6, wherein the control value is based on a difference between a DC voltage value of the DC terminals and said sum of absolute values, where the DC voltage value is a difference between the voltages on the DC terminals, wherein the control unit is configured to control the valves of a valve phase leg to be turned on in a case of AC fault ride-through of a fault on an AC line connected to the AC terminal of the valve phase leg, and wherein the DC voltage value is scaled down.

11. The voltage source converter according to claim 10, wherein the controller is configured to perform said control during reduced DC voltage operation.

12. The voltage source converter according to claim 1, wherein the controller is configured to perform the control of the available waveshaper phase arms during steady state operation.

13. The voltage source converter according to claim 1, wherein the controller is configured to perform said control of the available waveshaper phase arms during an AC fault handling mode in a case where a sum of rectified AC voltages fall.

14. A method of controlling a voltage source converter having two DC terminals and a number of AC terminals for providing a number of phases of an AC voltage, the converter comprising:
    a number of director valves connected in series between the DC terminals, the director valves being provided in pairs, where each pair forms a valve phase leg comprising an upper valve phase arm and a lower valve phase arm, where a junction between the upper and lower valve phase arms of a valve phase leg provides a primary AC terminal for a corresponding AC phase and a number of multilevel cells connected in series between the DC terminals, the cells being grouped in waveshaper phase legs, where each waveshaper phase leg is connected in parallel with a corresponding valve phase leg and comprises an upper and a lower waveshaper phase arm, where a junction between the upper and lower waveshaper phase arms of a waveshaper phase leg provides a secondary AC terminal for a corresponding AC phase and is linked to the primary AC terminal of the corresponding valve phase leg, wherein the upper waveshaper phase arm of a waveshaper phase leg is configured to be operated in conjunction with the upper valve phase arm of the corresponding valve phase leg, and wherein the lower waveshaper phase arm of a waveshaper phase leg is configured to be operated in conjunction with the lower valve phase arm of the corresponding valve phase leg, for forming of an AC waveform at least during steady state operation, the method comprising the steps of:
    controlling each waveshaper phase leg and valve phase leg for forming a number of phases of an output AC voltage, where the voltage of one phase is formed on the primary and secondary AC terminals of a pair of valves and waveshaper phase legs through alternately operating the valve of the upper valve phase arm and the cells of the corresponding upper waveshaper phase arm with the valve of the lower valve phase arm and cells of the corresponding lower waveshaper phase arm, thereby one waveshaper phase arm in each phase is inactive with regard to waveshaping as an available waveshaper phase arm; and
    further controlling at least one of the available waveshaper phase arms through controlling the waveshaper phase arm towards a target phase arm voltage using a control value that is based on a sum of absolute values of reference voltages used for waveshaping in the waveshaper phase legs.

15. The method according to claim 14, wherein the control value is based on a difference between a DC voltage value of the DC terminals and said sum of absolute values, where the DC voltage value is a difference between the voltages on the DC terminals.

16. The method according to claim 14, further comprising controlling the valves of a valve phase leg to be turned on in a case of AC fault ride-through of a fault on an AC line connected to the AC terminal pair of the valve phase leg.

17. The method according to claim 14, further comprising turning off the valves after detection of a DC pole fault and keeping the valves turned off until after fault clearance.

18. The method according to claim 14, wherein each director valve comprises at least one pair of anti-parallel thyristors and each waveshaper phase arm further comprises a commutation cell, and the controlling for forming a number of phases of an output AC voltage comprises controlling a commutation cell to reverse-bias the director valve of the corresponding valve phase arm for making the corresponding valve phase arm stop conducting current.

19. The method according to claim 18, wherein the number of the available phase arms is n and the controlling of the available waveshaper phase arms comprises controlling a maximum of (n−1) of the available waveshaper phase arms.

20. The method according to claim 18, wherein the available phase arm is available in an availability period and the controlling of the available waveshaper phase arm comprises controlling the available waveshaper phase arms after a start and before an end of the availability period.

21. The voltage source converter according to claim 18, further comprising controlling a firing angle of the valve thyristors to reduce the DC voltage after detection of a DC pole fault.

22. A computer program product for a voltage source converter having two DC terminals and a number of AC terminals for providing a number of phases of an AC voltage, the converter comprising:
    a number of director valves connected in series between the DC terminals, the director valves being provided in pairs, where each pair forms a valve phase leg comprising an upper valve phase arm and a lower valve phase arm, where a junction between the upper and lower valve phase arms of a valve phase leg provides a primary AC terminal for a corresponding AC phase and a number of multilevel cells connected in series between the DC terminals, the cells being grouped in waveshaper phase legs, where each waveshaper phase leg is connected in parallel with a corresponding valve phase leg and comprises an upper and a lower waveshaper phase arm, where a junction between the upper and lower waveshaper phase arms of a waveshaper phase leg provides a secondary AC terminal for a corresponding AC phase and is linked to the primary AC terminal of the corresponding valve phase leg, wherein the upper waveshaper phase arm of a waveshaper phase leg is configured to be operated in conjunction with the upper valve phase arm of the corresponding valve phase leg, and wherein the lower waveshaper phase arm of a waveshaper phase leg is configured to be operated in conjunction with the lower valve phase arm of the corresponding valve phase leg, for forming of an AC waveform at least during steady state operation, the computer program product being provided on a non-transitory data carrier and comprising computer program code, which when run by a processor causes the processor to control each waveshaper phase leg and valve phase leg for forming a number of phases of an output AC voltage, where the voltage of one phase is formed on the primary and secondary AC terminals of a pair of valves and waveshaper phase legs through alternately operating the valve of the upper valve phase arm and the cells of the corresponding upper waveshaper phase arm with the valve of the lower valve phase arm and cells of the corresponding lower waveshaper phase arm, thereby one waveshaper phase arm in each phase is inactive with regard to waveshaping as an available waveshaper phase arm, and wherein the computer program code is further configured to cause the processor to control at least one of the available waveshaper phase arms through controlling the waveshaper phase arm towards a target phase arm voltage using a control value that is based on a sum of absolute values of reference voltages used for waveshaping in the waveshaper phase legs.

* * * * *